United States Patent [19]
Moeller et al.

[11] Patent Number: 5,319,652
[45] Date of Patent: Jun. 7, 1994

[54] SUPER LUMINESCENT LIGHT SOURCE

[75] Inventors: Robert P. Moeller, Ft. Washington, Md.; William K. Burns, Alexandria, Va.; Elias Snitzer, Piscataway, N.J.

[73] Assignee: The United States of America as represented by the Secretary of the Navy, Washington, D.C.

[21] Appl. No.: 10,944

[22] Filed: Jan. 29, 1993

[51] Int. Cl.$^5$ .......................... H01S 3/06; G02B 6/26
[52] U.S. Cl. .......................................... 312/6; 385/98; 385/123; 385/126; 385/127; 385/128; 385/15; 385/27; 385/28
[58] Field of Search ...................... 372/6; 385/98, 123, 385/126, 127, 128, 15, 27, 28, 39, 41

[56] References Cited

U.S. PATENT DOCUMENTS

| | | | |
|---|---|---|---|
| 4,266,851 | 5/1981 | Salisbury | 385/127 |
| 4,799,234 | 1/1989 | Haeussler et al. | 372/6 |
| 5,084,881 | 1/1992 | Farries et al. | 372/6 |
| 5,087,108 | 2/1992 | Grasso et al. | 385/27 |
| 5,121,460 | 6/1992 | Tumminelli et al. | 385/126 |

*Primary Examiner*—Georgia Y. Epps
*Attorney, Agent, or Firm*—Thomas E. McDonnell; George Jameson

[57] ABSTRACT

A fiber superfluorescent light source is disclosed which suppresses laser oscillations without interfering with the pump light or the super luminescence. In a preferred embodiment of the invention, the fiber superfluorescent light source comprises a laser diode array for providing a pump beam at a wavelength of 0.81 microns, a first fiber doped with neodymium activator ions and being responsive to the pump beam for providing a spontaneous emission at a wavelength of 1.06 microns, and a second fiber optically coupled between the laser diode array and the first fiber for passing the pump beam therethrough to the first fiber to enable the first fiber to spontaneously emit light at the 1.06 micron wavelength and for suppressing backemissions of the 1.06 micron wavelength from the first fiber toward the laser diode array to prevent back reflection from the laser diode array and oscillations in the first fiber.

14 Claims, 5 Drawing Sheets

SUPER LUMINESCENT LIGHT SOURCE

BACKGROUND OF THE INVENTION

1. Field of the Invention

The present invention relates to fiber superfluorescent sources and particularly to a fiber superfluorescent light source which suppresses laser oscillations without interfering with the pump light or the super luminescence.

2. Description of the Related Art

There is great interest in using fiber superfluorescent sources in fiber optic gyroscopes as a replacement for semiconductor super luminescent diodes (SLD's). Potential benefits include higher available power, better wavelength stability with temperature, and improved lifetime. Multiclad Nd:fibers pumped by a laser diode array offer high output powers in a single mode core, but are susceptible to lasing due to feedback. This type of diode laser pumped source has been successfully employed in a fiber gyroscope using a backward pumping scheme. In particular this approach avoided the backreflection of backwards going superfluorescent emission off the high reflectivity diode array facet. In addition to concern about feedback and reflections, the problem of source integration must be considered, such that an all-fiber source can be spliced into the gyro without bulk optic components.

SUMMARY OF THE INVENTION

According, one object of the invention is to provide a super luminescent light source which prevents backward going superfluorescent emission from reaching the high reflectivity facet of the associated diode array.

Another object of the invention is to provide an improved 1.06 micron fiber gyro superfluorescent source.

Another object of the invention is to incorporate an element beween a pump light source and a laser amplifier that is absorbing to the laser light but transparent to the pump light in order to prevent the system from breaking into laser cavity oscillations at high amplifier gain.

A further object of the invention is to provide a super luminescent source with an element attached to the fiber laser to suppress the end reflections of superfluorescent emission and thereby prevent laser oscillations.

In the present invention, a fiber superfluorescent light source is disclosed which suppresses laser oscillations without interfering with the pump light or the super luminescence. In a preferred embodiment of the invention, the fiber superfluorescent light source comprises a laser diode array for providing a pump beam at a wavelength of 0.81 microns, a first fiber doped with neodymium activator ions and being responsive to the pump beam for providing a spontaneous emission at a wavelength of 1.06 microns, and a second fiber optically coupled between the laser diode array and the first fiber for passing the pump beam therethrough to the first fiber to enable the first fiber to spontaneously emit light at the 1.06 micron wavelength and for suppressing backemissions of the 1.06 micron wavelength from the first fiber toward the laser diode array to prevent reflection from the laser diode array and oscillations in the first fiber.

BRIEF DESCRIPTION OF THE DRAWINGS

These and other objects, features and advantages of the invention, as well as the invention itself, will become better understood by reference to the following description when considered in connection with the accompanying drawings wherein like reference numerals designate identical or corresponding parts throughout the several views and wherein.

DETAILED DESCRIPTION OF THE PREFERRED EMBODIMENT

Figure 1:
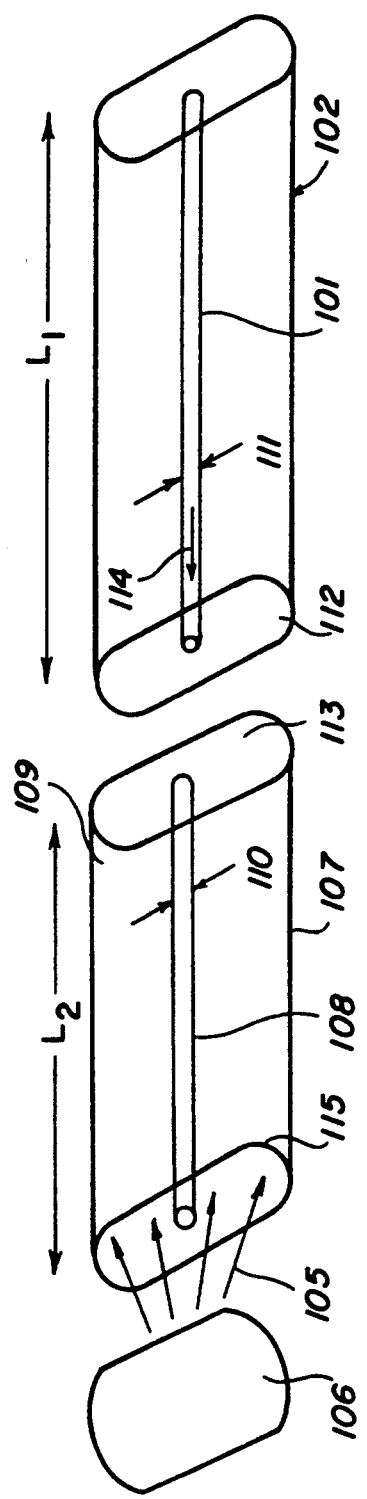
FIG. 1 illustrates a preferred embodiment of the invention.

Referring now to the drawings, FIG. 1 shows a schematic of the preferred embodiment of this invention. The Nd core 101 is shown with the first cladding 102 for a length of fiber $L_1$ that is sufficient to absorb typically ½ or more of the pumping light. This could be as short as 4 meters, or 20 meters or longer. The second cladding 203 (FIG. 2) and protective polymer coating or third cladding 204 (FIG. 2) are not shown in FIG. 1. The pump light 105 from a suitable pump source 106, such as a multiple stripe laser diode, is coupled into the first cladding 109 of the coupling fiber 107 which contains a core 108 that is doped with samarium (Sm) and the first cladding 109. The core 108 of the coupling fiber 107 id doped with samarium ions in concentrations ranging from 0.01 to 15 weight percent of $Sm_2O_3$. The second cladding and protective polymer coating or third cladding on the Sm coupling fiber 107 are not shown. The Sm core diameter 110 is equal to or larger than the Nd core diameter 111 so that when the surfaces 112 and 113 are butt fused together the Sm core diameter 110 boundary completely encompasses the Nd core diameter 111 boundary.

Furthermore the value of $NA_{12}$ for the Sm core 108 is equal to or slightly larger than the $NA_{12}$ value for the Nd core 101. The pump light 105 propagates unattenuated down the fiber 107, some in the Sm core 108 and some in the $SiO_2$ first cladding 109, and gets coupled into the Nd core and first cladding 101 and 102. This produces spontaneous emission, some of which is amplified and propagates toward the interface between the Nd and Sm cores 101 and 108, respectively, shown as 114. For good performance the reflection back into the Nd core 101 at the Nd-Sm interface 114 should not exceed $10^{-6}$. If the light source 106 couples directly into the Nd fiber without the presence of a coupling fiber 107 and for a surface 112 that is perpendicular to the fiber axis there is a Fresnel reflection at the 112 interface of:

$$\left(\frac{n_1-1}{n_1+1}\right)^2 = \left(\frac{1.46-1}{1.46+1}\right)^2 = 3.5 \cdot 10^{-2} \quad (1)$$

which is far too large for a good super luminescent source. If a coupling fiber without a Sm core is fusion spliced onto the end of the Nd fiber the reflection back into the ND core 101 is reduced by the ratio of the first cladding 102 area to the core 101 area (typically 100 to 300). There is also the Fresnel loss at the surface 115 so that the total attenuation would be about:

$$(3.5 \cdot 10^{-2})(300^{-1}) \approx 1.1 \cdot 10^{-3\,1\,4} \quad (2)$$

a value which is substantially improved by the coupling fiber 107 without the Sm core 108 but still short of the desired $10^{-6}$ number.

Figure 2:
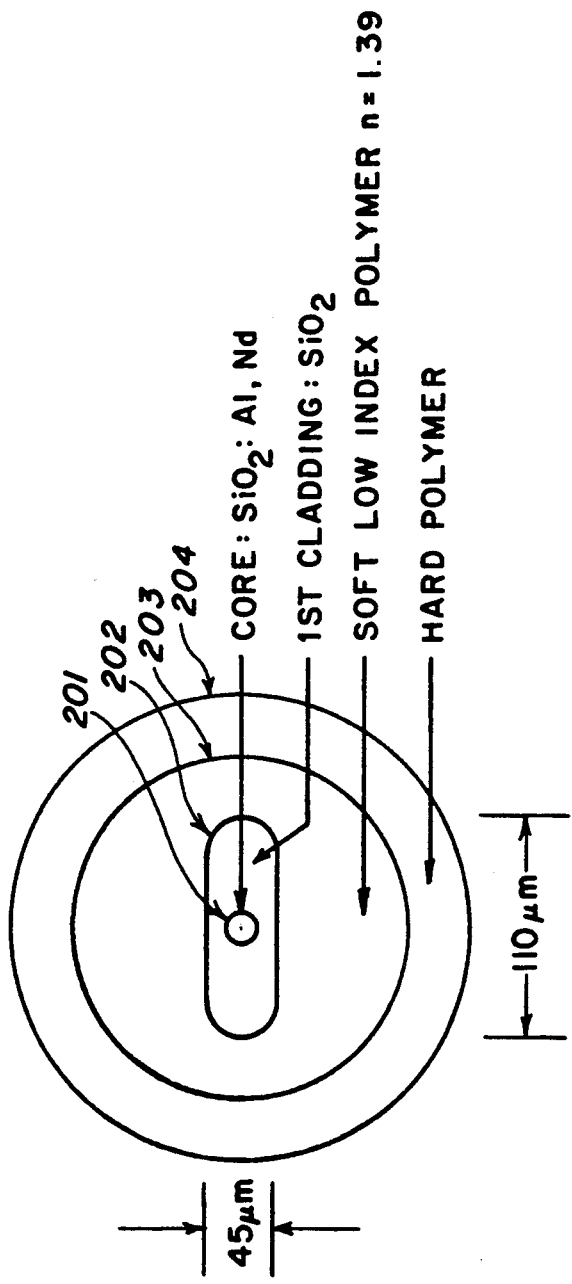
FIG. 2 shows a diagram of a double clad neodymium (Nd) fiber that can be used as a super luminescent source.

FIG. 2 shows a schematic of one version of a double clad neodymium (Nd) fiber that this invention provides improved performance when used as a super luminescent source. In this version the Nd single mode core 201, with index of refraction $n_1$ is surrounded by a first cladding 202 of fused SiO$_2$ of index of refraction $n_2$ ($n_2 < n_1$), which in turn is surrounded by a second cladding 203 material of still lower refractive index $n_3$ second cladding material 203 is a soft polymer with an index of refraction equal to 1.39. This material was fabricated by the Dainippon Company. Pump light is coupled into the first cladding 202 and as it propagates down the fiber is absorbed by the core 201.

Figure 5:
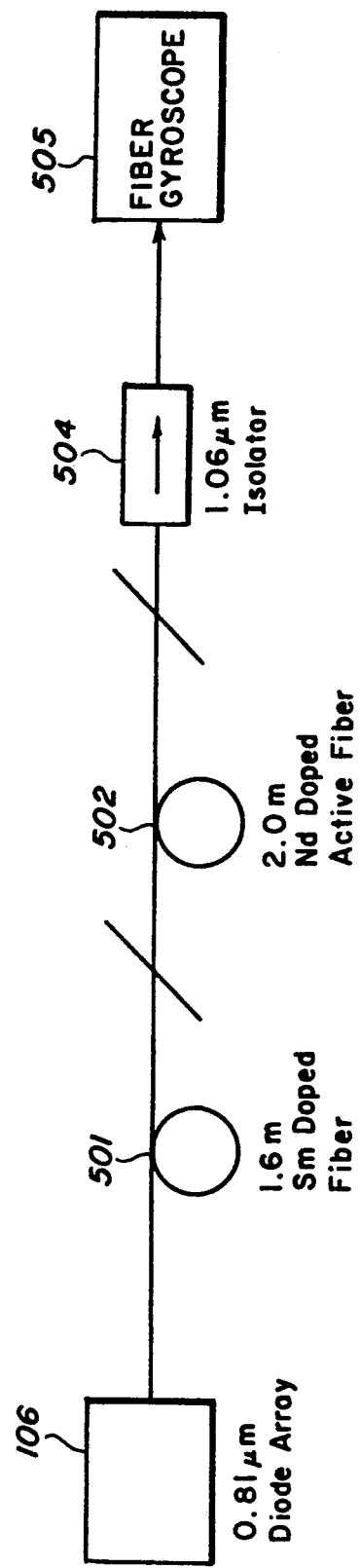
FIG. 5 is a schematic diagram of the fiber source configuration of the invention.

The numerical aperture (NA) is defined as the product of the refractive index of the material in front of the fiber multiplied by the sine of the maximum angle that a ray of light can make with the central axis of the fiber and that passes through the axis and still is totally internally reflected at the interface of core and 1st cladding for the Nd emission or the 1st and 2nd claddings for the pump light 105 for either of the Nd doped active fiber (502, FIG. 5) and the Sm doped fiber (502, FIG.5). The values for the two relevant NA's are:

$$NA_{12} = \sqrt{n_1^2 - n_2^2} \quad (3)$$

$$NA_{23} = \sqrt{n_2^2 - n_3^2} \quad (4)$$

Typical values for $NA_{12}$ are 0.12 to 0.16. For $NA_{23}$, the larger the value the better the operation of the device, because the preferred pump light source is a multiple stripe laser diode with an emission NA of 0.4 or greater. The SiO$_2$ first cladding 202 together with low index second cladding 203 does provide an $NA_{23}$ of 0.4. To provide mechanical strength a second polymer coating 204 is applied to the fiber as shown in FIG. 2.

Figure 3:
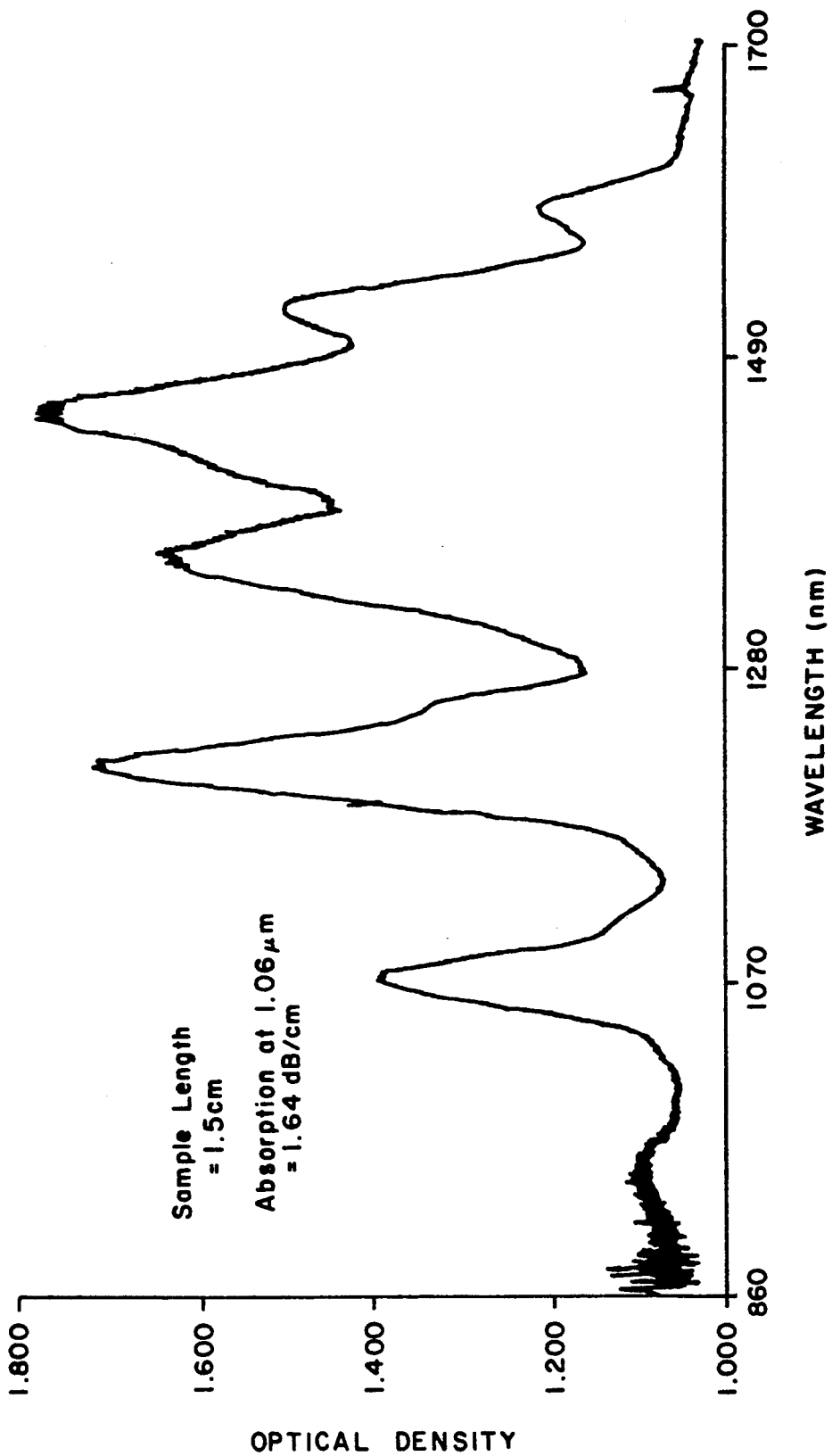
FIG. 3 shows the absorption (or optical density) spectrum for the samarium-doped $Al_2O_3$—$SiO_2$ preform.

By the addition of approximately three weight % of Sm to the Al$_2$O$_3$—SiO$_2$ core 201, absorption spectrum (optical density) characteristic shown in FIG. 3 is obtained, i.e. for this amount of Sm there is an attenuation of 1.64 dB/cm at the 1.06 $\mu$m. The required attenuation of $10^{-6}$ corresponds to an absorption at 1.06 $\mu$m of 60 dB which would be satisfied in a single pass by a length of 60/1.64=36.6 cm. A longer length of a few meters could be used to also suppress possible laser action at 0.92 $\mu$m without adversely affecting the 0.8 $\mu$m pumping or the super luminescent behavior of high intensity light emission at 1.06 $\mu$m from the other end of the Nd fiber.

Even with a Sm core 201 fiber, some attenuation must be given to the Fresnel reflection between the Nd core 101 (FIG. 1) with index of refraction $n_1$ and the Sm core 108 (FIG. 1) with index of refraction $n_1$. The required condition is:

$$\left(\frac{n_1-n_1'}{n_1+n_1'}\right) = \left(\frac{n_1-n_1'}{3}\right)^2 = 10^{-6} \quad (5)$$

or $$(n_1 - n_1') < 3 \times 10^{-3}$$

i.e, the core indices for the Nd doped and Sm doped fibers should not differ by more than $3 \times 10^{-3}$.

For super luminescent sources, the considerations above also apply to all four level laser systems where a coupling fiber is used with a core that is transparent at the pump wavelength but absorbing at the laser wavelength.

Figure 4:
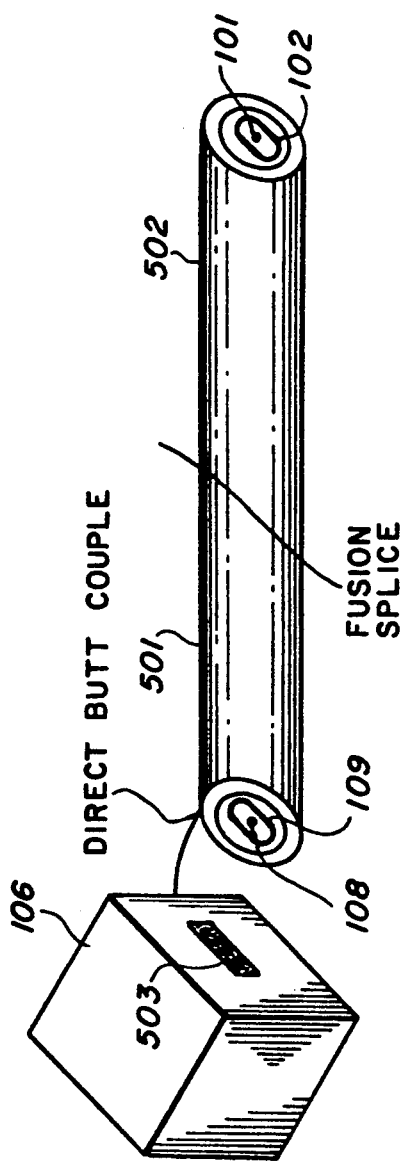
FIG. 4 illustrates how the various components of the superfluorescent source are optically coupled together.

FIG. 4 illustrates how the various components of the superfluorescent source are optically coupled together. As shown in FIG. 4, the Nd-doped fiber 502 is fusion spliced to the Sm-doped fiber 501. The other end of the Sm-doped fiber 501 is butt coupled directly to the highly reflective face 503 of the pump source 106.

FIG. 5 is a schematic diagram of the fiber source configuration of the invention. The Sm-doped fiber 501 (having an exemplary length of 1.6 m) is butt coupled to an exemplary 0.5 W laser diode array. The Nd-doped fiber 502 (having an exemplary length of 20 m) is spliced to the Sm-doped fiber (0.8 dB splice loss) and to the input fiber lead of a 1.06 $\mu$m isolator 504 (4 dB loss). When the fiber source is to be used to furnish light to, for example, a fiber gyroscope 505 (or any other suitable equipment) the isolator 504 can be optically coupled to the fiber gyroscope 505. The isolator 504 is not a necessary component of the fiber source of the invention. In some applications it can be omitted.

Figure 6:
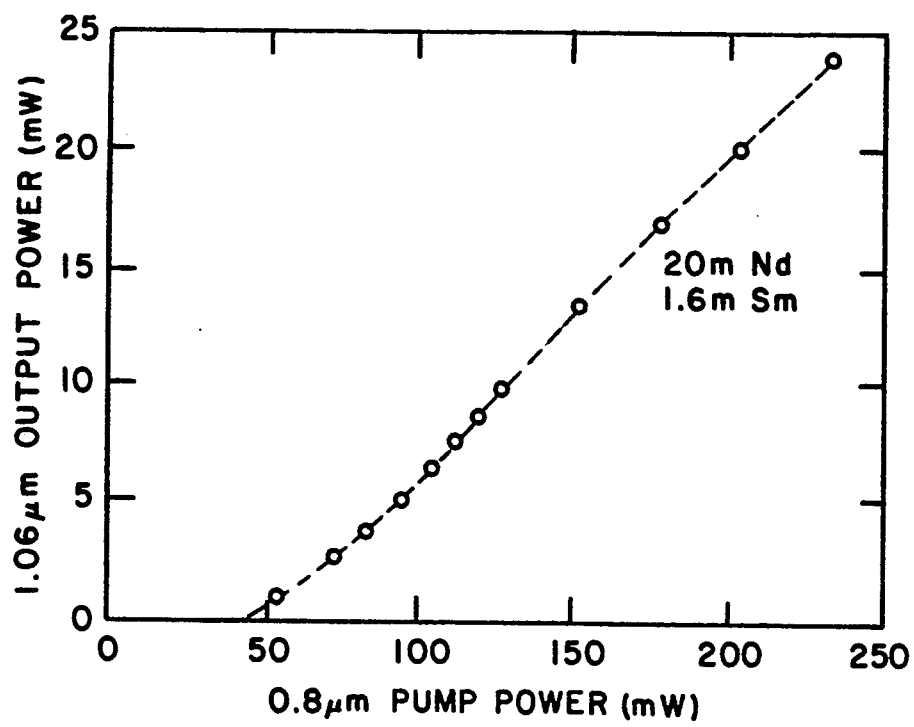
FIG. 6 is a graph showing the Nd-doped fiber output power vs. laser diode array drive current.

The Nd doped fiber output power vs. diode array drive current is shown in FIG. 6. For this measurement the isolator 504 was removed and the fiber output end index matched with index matching matching gel. Up to 24 mW at 1.06 $\mu$m output was obtained for a pump input to the Nd fiber of approximately 230 mW at 0.81 $\mu$m. No lasing threshold was observed up to the maximum power available.

In an alternative arrangement, the Nd doped fiber core 101 can be replaced by a ytterbium doped fiber core. When pumped by a pumplight 105 (having an appropriate pump wavelength) from the pump source 106, the ytterbium emission between about 1.01 $\mu$m and about 1.06 $\mu$m is absorbed by the samarium doped fiber core 108, as shown by the absorption spectrum of FIG. 3.

Therefore, what has been described in a preferred embodiment of the invention is a fiber superfluorescent light source which suppresses laser oscillations without interfering with the pump light or the super luminescence. In the preferred embodiment of the invention, the fiber superfluorescent light source comprises a laser diode array for providing a pump beam at a wavelength of 0.81 microns, a first fiber doped with neodymium activator ions and being responsive to the pump beam for providing a spontaneous emission at a wavelength of 1.06 microns, and a second fiber optically coupled between the laser diode array and the first fiber for passing the pump beam therethrough to the first fiber to enable the first fiber to spontaneously emit light at the 1.06 micron wavelength and for suppressing backemissions of the 1.06 micron wavelength from the first fiber toward the laser diode array to prevent reflection from the laser diode array and oscillations in the first fiber.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A super luminescent light source comprising:
a pump light source for producing a pump beam;
a first fiber doped with first activator ions and being responsive to a pump beam at a first wavelength from said pump light source for emitting light at a second wavelength; and
means optically coupled between said pump light source and said first fiber for passing the pump beam to said first fiber to enable said first fiber to emit light at the second wavelength and for suppressing backemissions from said first fiber to prevent oscillations in said first fiber.

2. The super luminescent light source of claim 1 wherein:
said first fiber is a double clad active fiber having first and second claddings and predetermined outer transverse dimensions of size and shape; and
said passing means is a second fiber having third and fourth claddings, said second fiber having outer transverse dimensions of the same size and shape as said first fiber.

3. The super luminescent light source of claim 2 wherein:
said double clad active fiber includes a core; and
said second fiber includes a core which is equal to or larger than said core of said double clad active fiber, said core of said second fiber having a constituent that is transparent to said pump beam and absorbant to the backemission of the light at a second wavelength.

4. The super luminescent light source of claim 3 wherein:
said first activator ions in said first fiber are neodymium;
said neodymium doped first fiber produces an emission
at a second wavelength of 1.06 microns; and
said absorbing constituent in said second fiber includes samarium ions doped into said core of said second fiber in concentrations ranging from 0.01 to 15 weight percent of $Sm_2O_3$.

5. The super luminescent light source of claim 3 wherein:
each of said first and second fibers includes another cladding.

6. The super luminescent light source of claim 3 wherein:
said first activator ions in said first fiber are
said ytterbium doped first fiber produces an emission at a second wavelength between about 1.01 microns and about 1.06 microns; and
said absorbing constituent in said second fiber includes samarium ions doped into said core of said second fiber.

7. An optical system comprising:
a super luminescent light source comprising:
a pump light source for producing a pump beam;
a first fiber doped with first activator ions and being responsive to a pump beam at a first wavelength from said pump light source for emitting light at a second wavelength; and
means optically coupled between said pump light source and said first fiber for passing the pump beam to said first fiber to enable said first fiber to emit light at the second wavelength and for suppressing backemissions from said first fiber to prevent oscillations in said first fiber; and
optical means coupled to said first fiber for utilizing the light emitted from said first fiber at the second wavelength.

8. The optical system of claim 7 further including:
an isolator coupled between said first fiber and said optical means for preventing light from passing from said optical means back to said first fiber.

9. The optical system of claim 7 wherein said optical means includes:
a fiber gyroscope.

10. The optical system of claim 9 further including:
an isolator coupled between said first fiber and said fiber gyroscope for preventing light from passing from said fiber gyroscope back to said first fiber.

11. The optical system of claim 7 wherein:
said first fiber is a double clad active fiber having first and second claddings and predetermined outer transverse dimensions of size and shape; and
said passing means is a second fiber having third and fourth claddings, said second fiber having outer transverse dimensions of the same size and shape as said first fiber.

12. The optical system of claim 11 wherein:
said double clad active fiber includes a core; and
said second fiber includes a core which is equal to or larger than said core of said double clad active fiber, said core of said second fiber having a constituent that is transparent to said pump beam and absorbant to the backemission of the light at a second wavelength.

13. The optical system of claim 12 wherein:
said first activator ions in said first fiber are neodymium;
said neodymium doped first fiber produces an emission at a second wavelength of 1.06 microns; and
said constituent in said second fiber includes samarium ions doped into said core of said second fiber.

14. The optical system of claim 13 wherein:
said constituent in said second fiber includes samarium ions doped into said core of said second fiber in concentrations ranging from 0.01 to 15 weight percent of $Sm_2O_3$.

* * * * *